Aug. 17, 1965  W. E. SCHWENK  3,200,557
METHOD AND APPARATUS FOR SEALING MILK CONTAINERS AND THE LIKE
Filed Sept. 25, 1961  4 Sheets-Sheet 1
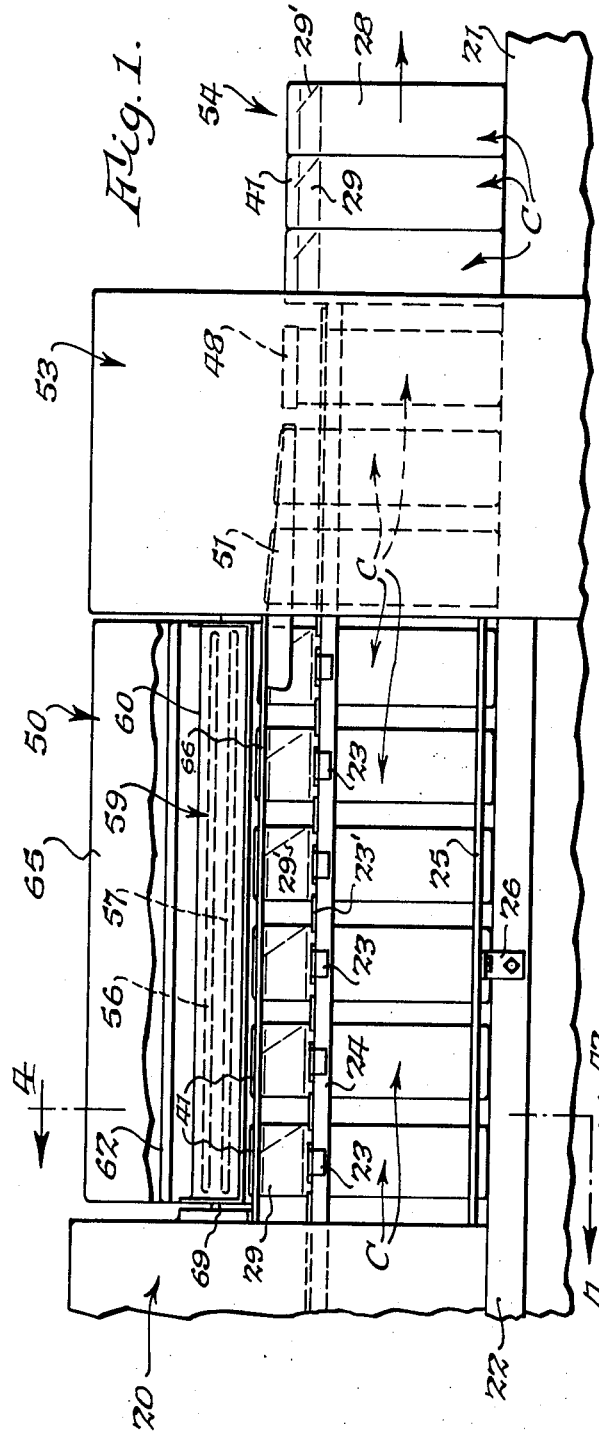
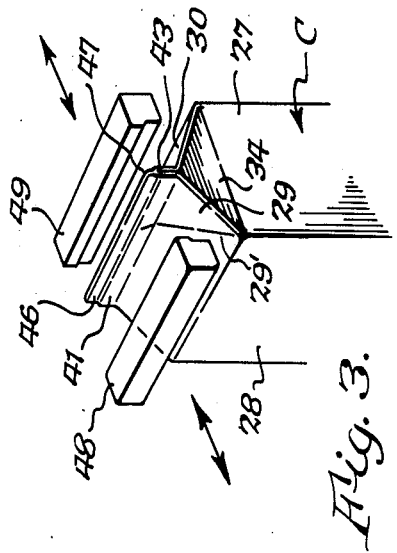
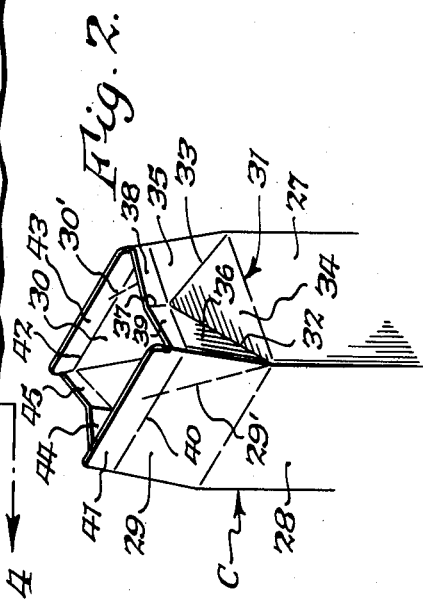

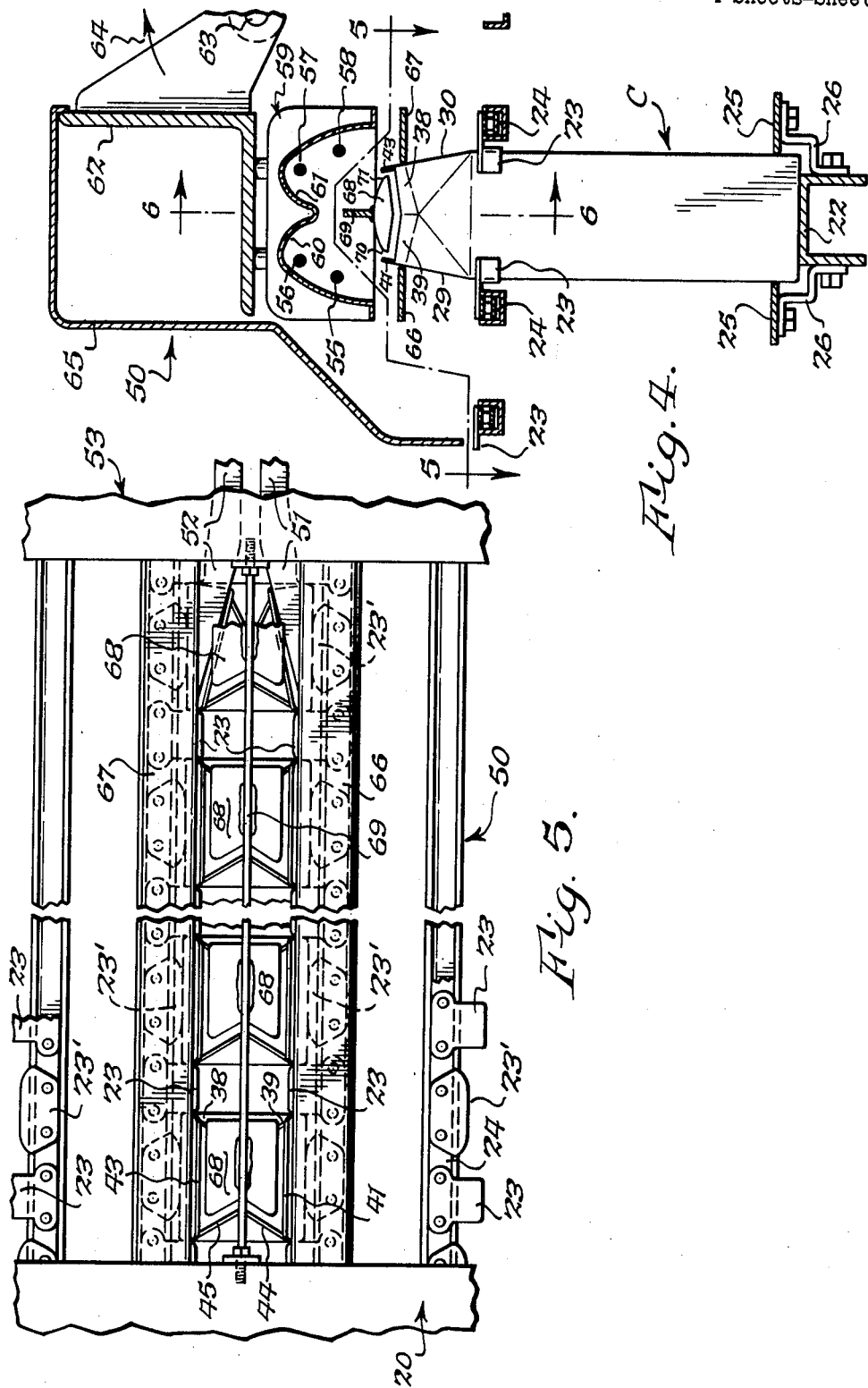

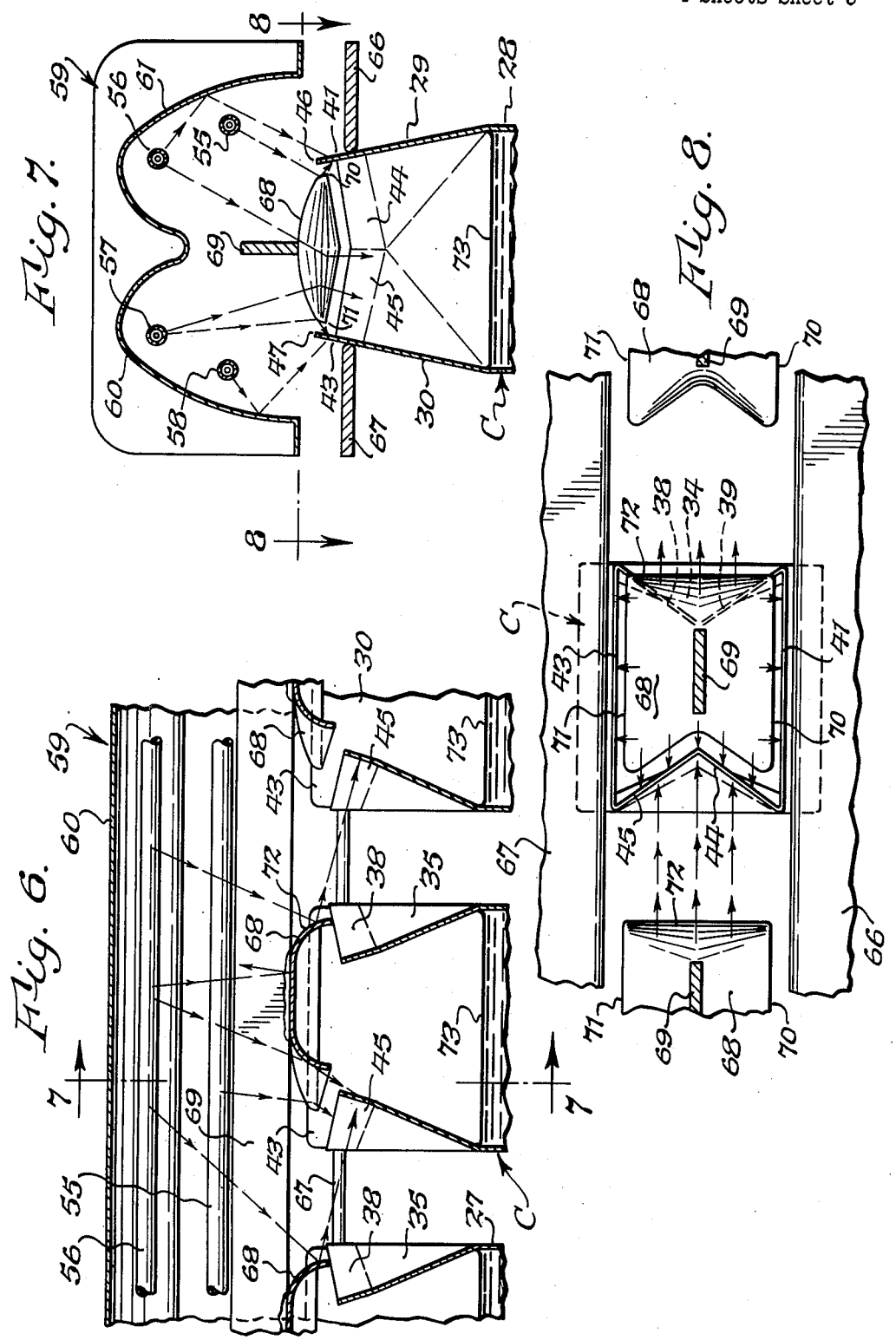

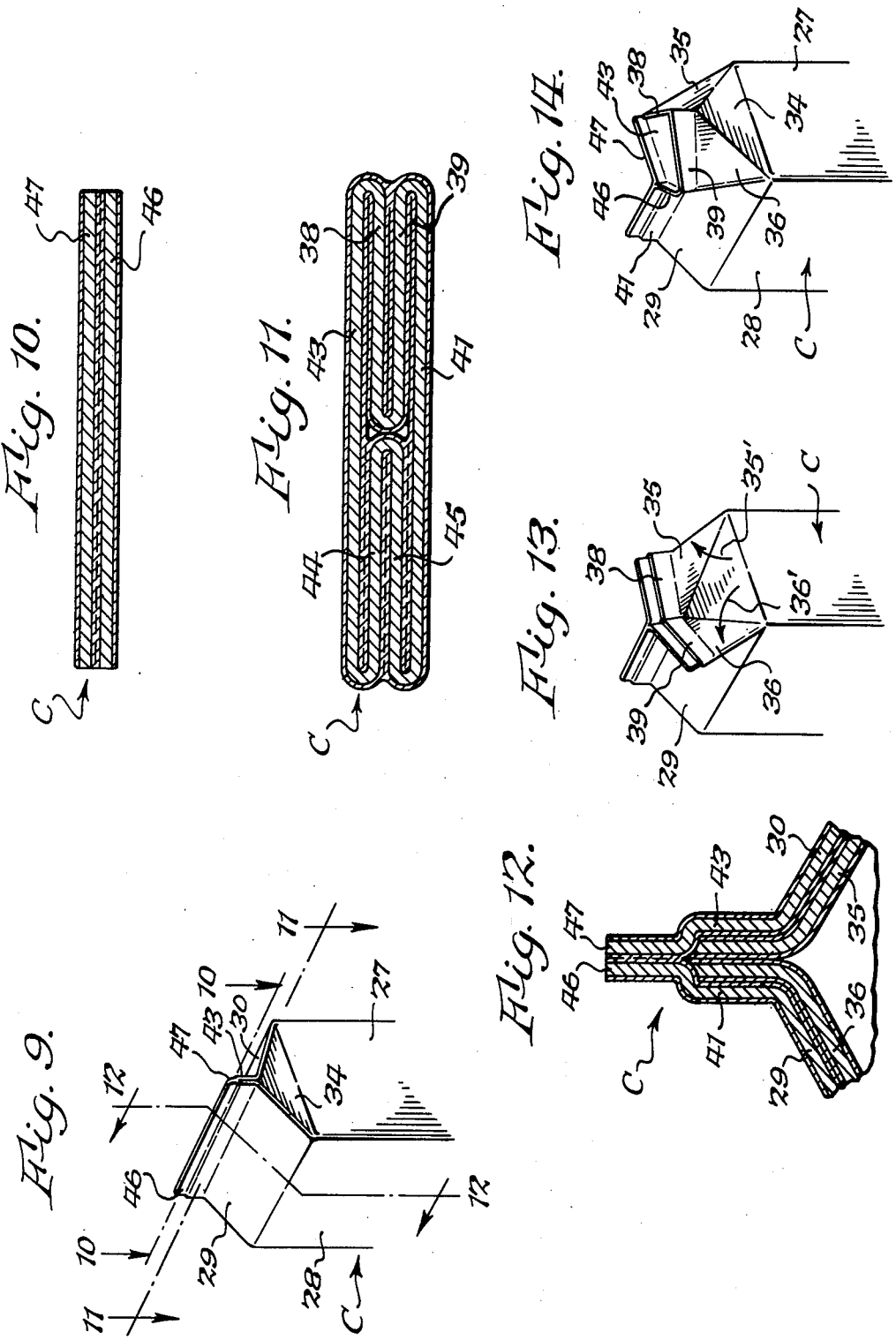

United States Patent Office 3,200,557
Patented Aug. 17, 1965

3,200,557
METHOD AND APPARATUS FOR SEALING MILK CONTAINERS AND THE LIKE
William E. Schwenk, Norristown, Pa., assignor to International Paper Company, New York, N.Y., a corporation of New York
Filed Sept. 25, 1961, Ser. No. 140,365
11 Claims. (Cl. 53—39)

The present invention relates to the heat sealing of plastic coated products, and more particularly to the heat sealing of plastic coated paper containers of the type which requires a liquid-tight seal and which must be partially openable as to form a spout or like opening.

The invention is principally concerned with the heat sealing of polyethylene coated gable-topped milk containers of the type exemplified by United States Patent No. 2,750,095, issued June 12, 1956 to Alden, and hence will be described in connection with this type of container. It should be understood, however, that the principles of the invention are applicable to the heat sealing of other plastic coated products which present similar problems.

Polyethylene coated milk cartons are generally delivered to a dairy in the form of flattened tubes sealed along a side edge. These flattened tubes are fed to a machine which successively opens the flattened tube, closes and heat seals the bottom, fills the carton with milk to the desired level, and then closes and heat seals the top. The closing and heat-sealing steps involve first heating the polyethylene surfaces which are to overlap to a softening temperature, e.g., 250–500° F., and then bringing these surfaces into intimate contact with each other to cause the heated and softened polyethylene surfaces to bond together. The bonding must be strong in order to assure a leakproof container.

In gable-topped containers of the type exemplified by the aforementioned Alden patent, a pouring spout is automatically formed when the opposing surfaces forming one gable end of the container top are manually separated. A problem arises where portions of the spout are formed from heat-sealed polyethylene, since separating such sealed surfaces results in the polyethylene being pulled away from the paper backing on one or the other of the opposing surfaces leaving a roughened paper surface which will contact the milk or other liquid to be dispensed through the spout. This undesirable condition results from the fact that the polyethylene-polyethylene bond achieved in heat sealing is stronger than the bond between the polyethylene and its paper backing.

Various expedients have been proposed for overcoming the delamination problem in heat-sealed milk containers, some of which have been successful, although at a substantial increase in the cost of producing the containers. The principal object of the present invention has been to provide a novel and improved method and apparatus for overcoming the spout delamination problem without any increase in the cost of the containers.

Another object of the invention has been to provide such a method and apparatus which can be used without any special container construction and which will not interfere with the usual container filling and sealing operation.

A further object of the invention hsa been the provision of such a method and apparatus which results in more efficient use of the heat employed for sealing the container top.

Another object of the invention has been the provision of such a method and apparatus which minimizes heating of the milk or other liquid in the container during the heating of the container top.

Other and further objects, features and advantages of the invention will appear more fully from the following description taken in connection with the appended drawings, in which:

FIG. 1 is a side elevational view of the container top heating and sealing section of a container filling and closing machine embodying the invention.

FIG. 2 is a perspective view of the upper portion of a milk container showing the top prior to closing and sealing thereof;

FIG. 3 is a perspective view showing the container of FIG. 2 with the top closed and sealed and illustrating diagrammatically the action of the container top closing jaws;

FIG. 4 is a cross-sectional view taken along the line 4—4 of FIG. 1;

FIG. 5 is a sectiontal view taken along the line 5—5 of FIG. 4;

FIG. 6 is a sectional view taken along the line 6—6 of FIG. 4;

FIG. 7 is a cross-sectional view taken along the line 7—7 of FIG. 6;

FIG. 8 is a sectional view taken along the line 8—8 of FIG. 7;

FIG. 9 is a perspective view showing the upper portion of a milk container wtih the top closed and sealed;

FIG. 10 is an enlarged cross-sectional view taken along the line 10—10 in FIG. 9;

FIG. 11 is an enlarged cross-sectional view taken along the line 11—11 of FIG. 9;

FIG. 12 is an enlarged partial sectional view taken along the line 12—12 of FIG. 9;

FIG. 13 is a perspective view showing the upper portion of the milk container of FIG. 9 with the container spout partially open; and FIG. 14 is a view similar to FIG. 13 but with the container spout fully open.

Referring now to the drawings, and more particularly to FIGS. 1 and 4, milk containers C are advanced in single file from a filling section, diagrammatically shown at 20, toward the exit end of the machine located beyond the point 21. In the filling section 20 the containers are filled with milk or other liquid to the desired height. The containers are supported in upright position on an inverted channel member 22 suitably mounted on the machine frame, and are advanced along the member 22 by individual pusher arms 23 carried on powered endless belts 24. Pusher arms 23 engage each container along the rear surface at either side and push the containers along. The pusher arms 23 are spaced so that the containers are spaced from each other. The containers are maintained in an upright position and aligned with channel 22 by side guide rails 25 supported from channel 22 by brackets 26. Side guide members 23' carried by belts 24 between the pusher arms 23 also contact the container sides to maintain the containers upright and aligned.

The containers C are usually square in cross section and are each formed from a single blank of paperboard coated on both sides with polyethylene and suitably scored for forming the various container walls. Typically, the paper might be, for example, 0.018 inch thick, the inside polyethylene layer might be, for example, 0.0011 inch thick, while the outer polyethylene layer might be, for example, 0.00075 inch thick.

In FIG. 2 the container front wall panel is shown at 27 and one side wall panel is shown at 28. The other side wall panel and the rear wall panel are similar to the illustrated front and side wall panels, respectively. One of the side wall panels is provided with a sealing flap forming a side closure seam when sealed to the adjacent wall panel.

Integral with the upper ends of the side wall panels, respectively, are top closure flaps 29 and 30. Integral with the upper end of front wall panel 27 is a top closure flap 31 scored along diagonal lines 32 and 33 to form triangular panels 34, 35 and 36. An upwardly projecting extension of panel 31 is divided by a vertical score line 37 into inner rib panels 38 and 39. A similar construction is provided at the top of the rear wall panel. An upwardly projecting extension of panel 29 above score line 40 forms a side rib panel 41, while an upwardly projecting extension of panel 30 above score line 42 forms a side rib panel 43.

The container C with the top closed is illustrated in FIGS. 3 and 9. The panels 29 and 30 become the gable roof panels, while the panels 34, 35 and 36 become the front gable end. The similar three panels at the rear become the rear gable end. The panels 38 and 39 are brought into sealing contact with each other to form inner top rib elements, while the corresponding panels 44 and 45 are likewise brought into contact with each other to form inner top rib elements. The side rib panels 41 and 43 are caused to overlie the inner rib elements, while the topmost portions of the panels 41 and 43 are brought into sealing contact with each other. These topmost portions are located above the level of the inner rib elements and are shown at 46 and 47 in FIG. 3.

The container top is closed and sealed by the action of closing jaws 48 and 49 which urge the rib elements into the intimate contact described. The front faces of the closing jaws are L-shaped to permit intimate contact of the rib portions 46 and 47 without crushing of the lower parts of the rib panels 41 and 43 which have the inner rib panels interposed therebetween. Before the closing jaws are brought into contact with a container, the top of the container is gradually brought from a fully open and erect condition to approximately the condition shown in FIG. 3. This is effected by closing guides which gradually urge the container top side portions together. FIG. 2 illustrates a container with the top slightly bent toward closed condition, this being the condition of the container top maintained during heating prior to sealing.

The container opening action is illustrated in FIGS. 13 and 14. Thus the user exerts an upward and outward pushing pressure, as with the thumbs, on panels 35 and 36, this pressure being suggested by the arrows 35' and 36' in FIG. 13. This action breaks the seal between panels 38 and 39, leaving the container partially open, as in FIG. 13. The outward motion of panels 35 and 36 and the adjacent portions of side panels 30 and 29, respectively, are facilitated by bending of the panels 30 and 29 along score lines 30' and 29', respectively.

The container is then completely opened by exerting an inward pushing pressure along the score lines separating panels 36 and 29 and panels 35 and 30. This action breaks the seal between panels 39 and 41, between panels 38 and 43, and between the front portions of panels 41 and 43, and forces panels 35 and 36 outwardly to form a pouring spout, as shown in FIG. 14. The rear gable end of the container will not be disturbed by the container opening and spout forming operation but will remain sealed.

As mentioned previously, the containers C are filled in filling section 20. The filled containers advance in single file through a heating section 50 in which the polyethylene surfaces that are to be bonded together to form the top closure seal under action of closing jaws 48 and 49 are brought to the desired heat-sealing temperature. Six containers are shown occupying the heating section 50 in FIG. 1.

The leading container in heating section 50 contacts closing guides 51 and 52 (best shown in FIG. 5) which urge the panels 29 and 30 toward each other to bring the container top nearly to closed condition.

The containers leaving heating section 50 enter sealing section 53. In section 53 the closing guides 51 and 52 present parallel surfaces on opposite sides of the container top, their configuration bringing the top panels into position to be forced into their final condition (FIG. 3) by action of closing jaws 48 and 49. The sealed containers leaving sealing section 53 enter an exit section 54.

The containers are advanced through the filling, heating and sealing sections by the endless belts 24 and the pusher arms 23. In the exit section 54 the containers are no longer maintained in their spaced apart relation, and as each container is pushed out of sealing section 53 it contacts the next preceding container and advances the preceding containers by pushing them forward.

The belts 24 act to advance the containers C through the filling, heating and sealing sections by intermittent motion. That is to say, all of the containers are advanced and then all are stopped. The dwell time may be varied, but, typically, the intervals of motion and the intervals of dwell may be made equal so that fifty percent of the container travel time is spent in motion and fifty percent is spent at rest.

In the heating section, heating is effected by means of radiant energy. The radiant energy is supplied by elongated electrically powered heating elements 55, 56, 57 and 58 disposed above the container tops and parallel to the path of advance of the containers. The heating elements 55–58 are of the type which provides most of their heat in the form of infrared radiation. The disposition of the heating elements relative to the container tops is best shown in FIGS. 4 and 7. Typical radiant heat waves are illustrated by the dashed arrows in FIGS. 6, 7 and 8.

The heating elements 55–58 are in a reflector unit 59 the inner surface of which in cross section provides a generally parabolic reflector 60 cooperating with the elements 55 and 56 to direct radiant heat waves downwardly primarily onto one side of the container tops and a generally parabolic reflector 61 cooperating with the elements 57 and 58 to direct radiant heat waves downwardly primarily onto the other side of the container tops.

The line of juncture of the reflectors 60 and 61 is aligned with the center lines of the containers. The reflector unit 59 is suspended from an L-shaped bracket 62 which is hingedly attached to the machine frame, as shown at 63, to permit the reflector unit 59 and its heating elements to be swung clear of the containers, as shown by the arrow 64 in FIG. 4. A hood 65 is carried by the bracket 62 and extends downwardly over the side of the heating section, as shown in FIGS. 1 and 4.

The container tops are maintained in alignment with the heating elements by means of guide bars 66 and 67 which extend lengthwise of the heating section and are arranged to contact the container top sides in the area of the fold lines 40 and 42, respectively. The guide bars 66 and 67 keep the side top panels 29 and 30 flexed slightly inwardly, as shown in FIG. 4 and also in FIG. 2. The natural springiness of the paperboard keeps the container top sides in contact with the guide bars 66 and 67 and thus the container tops are held substantially open. The guide bars 66 and 67 also serve as shields which prevent heat rays from contacting the outer surface of panels 29 and 30, respectively.

The heat applied to the container tops during their passage under the heating elements 55–58 heats the polyethylene surfaces which are to be bonded together under action of the closing jaws 48 and 49, as described previously.

When the user of a container opens the container top and forms the spout, the usual opening forces exerted will not break previously heat-sealed polyethylene-polyethylene bonds, but instead the polyethylene coating will pull away from one or the other of the paper surfaces. When this happens, torn surfaces in which raw and scuffed paper is exposed are presented. By raw paper is meant a paper surface from which some or all of the polyethylene coating is removed by the tearing action occurring during the opening operation. In accordance with the invention, these torn areas are minimized so that only minor areas of raw paper will exist, and these areas are not in the main portions of the pouring spout surface.

This is accomplished by providing reflecting baffles disposed over the positions occupied by the containers during the dwell intervals of their passage through the heating section. The baffles are constructed and arranged to reflect heat rays away from the spout areas which it is not desired to seal and to concentrate the heat rays on other surfaces which it is desired to seal. In this way certain of the container top areas are not heated to the polyethylene bonding temperature and hence do not seal under action of closing jaws 48 and 49.

The container top closure areas which are to be sealed and those which are not to be sealed can be identified in FIGS. 10, 11 and 12, which are sectional views of the container top showing the paperboard and inside and outside polyethylene coatings in greatly exaggerated size. The joinder of polyethylene to polyethylene without a seal is shown by solid lines, while the joinder of polyethylene to polyethylene with a seal is shown by dashed lines.

From FIG. 10 it appears that the upper portions 46 and 47 of panels 41 and 43 are to be sealed. The front gable end panels 38 and 39, as shown in FIG. 11, are not to be sealed together except for a narrow strip adjacent the fold line between panel 38 and panel 43 and a narrow strip adjacent the fold line between panel 39 and panel 41. Similarly, the panel 38 is not to be sealed to the panel 43 except for a narrow strip adjacent the fold line between these panels. Again, the panel 39 is not to be sealed to the panel 41 except for a narrow strip adjacent the fold line between these panels. The narrow strips referred to might be, for example, about 3/16" wide. Rear gable end panels 44 and 45 should be sealed together and to the panels 43 and 41, respectively.

The baffles which effect the desired heat application are designated 68, and one baffle is provided for each container in the heating section. The baffles are disposed above the respective containers in the container positions occupied during the dwell portions of the container feed cycle. The baffles 68 are suspended from an axially extending support bar 69, the baffles being welded or otherwise affixed to the bar 69. The bar 69 is in turn suitably affixed to the machine frame at opposite ends of the heating section.

The baffles 68 should have a transverse cross section approximately cycloidal in shape, as shown in FIGS. 4 and 7, with the high point of the curve at the center line of container travel. The longitudinal side edges 70 and 71 of the baffles should be parallel to the panels 41 and 43 and should be disposed at an elevation approximately opposite the lower edges of the upper portions 46 and 47 of the panels 41 and 43, as shown in FIGS. 4, 7 and 8. The baffle width should be selected so that the longitudinal side edges of the baffles are spaced for the adjacent panel portions 46 and 47. The front edges 72 of the baffles are transverse to the container path of advance and are located axially so as to be slightly to the rear of the leading edge of the respective containers when the latter are in their dwell positions.

The spacing between the baffle edges 70 and 71 and the panel portions 46 and 47, respectively, permits heat rays to impinge freely on the inner surfaces or portions 46 and 47. This spacing should not be so great as to permit any substantial incidence of heat rays on the inner surfaces of panels 29 and 30. The spacing between baffle edges 72 and the leading edge of the containers permits heat rays to impinge on the narrow strips of the inner and outer surfaces of panels 38 and 39 which are to be sealed, as described previously.

The rear edges of the baffles terminate forwardly of the container rear edges and are formed with a V-shaped notch, with the point of the V extending forwardly, as shown in FIGS. 5 and 8. This arrangement permits heat rays to impinge freely on the various rear gable surfaces to be sealed, as described previously.

The baffles should be made of a material with high reflection qualities and low tarnish potential, such as aluminum or stainless steel. The cycloidal shape (either common or curtate) of the baffles and their positioning relative to the container tops cause heat rays impinging on appproximately the upper half of each baffle to be reflected back to the source, i.e., reflecting surfaces 60 and 61, so as to be available for heating purposes upon further reflection while being held out of contact with those portions of the front gable which should be prevented from reaching a polyethylene sealing temperature. Heat rays impinging on approximately the lower one-eighth of each baffle will be reflected directly onto the inner surfaces of flap portions 46 and 47 and hence will perform their desired heating function without further reflection.

The baffles 68 will not protect the container spout areas from heat rays during most of the container travel time from dwell position to dwell position. However, the protection of the spout areas during the dwell time will divert a substantial proportion of the unwanted heat, e.g., 40%, from these areas and will be sufficient to prevent the polyethylene in these areas from reaching a heat-sealing temperature. Moreover, it appears that completely preventing heat from reaching the spout areas would have a tendency to weaken the seal at the back gables.

If it be desired to enhance even further the transfer of heat rays reflected from the baffles to areas to be sealed, small reflectors, preferably of the parabolic type, may be positioned to deflect rays reflected from the baffles directly onto desired polyethylene surfaces.

The baffles 68 afford an additional advantage in that they largely prevent heat rays from penetrating to the milk or other liquid surface 73, as clearly shown in FIGS. 6 and 7.

While the invention has been described in connection with specific embodiments thereof, various modifications thereof will occur to those skilled in the art without departing from the spirit and scope of the invention as set forth in the appended claims.

What is claimed is:

1. In the method of forming a liquid-tight seal at the top of a container made from a flexible blank having a heat-sealable plastic coating on both sides thereof, said container top being formed by folding said blank along score lines and heat sealing overlapping surfaces of the folded blank, the steps of advancing said container with the top substantially open through a heating zone, periodically stopping the advance of said container through said heating zone to provide successive intervals of motion and dwell, directing heat rays onto the top of said container while said container is in said heating zone to heat the plastic coatings of said overlapping surfaces to be joined to form the top closure of said container to a heat-sealing temperature, and partially shielding said container from said heat rays during said intervals of dwell by providing baffle members located in the path of said heat rays and spaced from each other in the direction of advance of said container, said baffle members deflecting heat rays directed during said intervals of dwell at selected surfaces of said blank forming a part of the top of said container, the relative durations and numbers of said intervals of motion and dwell being selected so that the plastic coatings of said selected surfaces do not achieve a heat-sealing temperature.

2. In the method of forming a liquid-tight seal at the top of a container made from a paperboard blank having a polyethylene coating on both sides thereof, said container top being formed by folding said blank along score lines and heat sealing overlapping surfaces of the folded blank, the steps of advancing said container with the top substantially open through a heating zone, periodically stopping the advance of said container through said heating zone to provide successive intervals of motion and dwell, directing heat rays onto the top of said container while said container is in said heating zone to heat the polyethylene coatings of said overlapping surfaces to be joined to form the top closure of said container to a heat-sealing temperature, partially shielding said container from said heat rays during said intervals of dwell by providing baffle members located in the path of said heat rays and spaced from each other in the direction of advance of said container, said baffle members deflecting heat rays directed during said intervals of dwell at selected surfaces of said blank forming a part of the top of said container, and directing a portion of said deflected heat rays onto said overlapping surfaces to be joined to form the top closure of said container, the relative durations and numbers of said intervals of motion and dwell being selected so that the polyethylene coatings of said selected surfaces do not achieve a heat-sealing temperature.

3. In the method of forming a liquid-tight seal at the top of a container made from a flexible blank having a heat-sealable plastic coating on both sides thereof, said container top being formed by folding said blank along score lines and heat sealing overlapping surfaces of the folded blank, the steps of advancing said container in upright position and with the top substantially open through a heating zone, periodically stopping the advance of said container through said heating zone to provide successive intervals of motion and dwell, directing heat rays onto the top of said container while said container is in said heating zone to heat the plastic coatings of said overlapping surfaces to be joined to form the top closure of said container to a heat-sealing temperature, partially shielding said container from said heat rays during said intervals of dwell by providing baffle members located in the path of said heat rays and spaced from each other in the direction of advance of said container, said baffle members deflecting heat rays directed during said intervals of dwell at selected surfaces of said blank forming a part of the top of said container, directing a portion of said deflected heat rays directly onto said overlapping surfaces to be joined to form the top closure of said container, and directing another portion of said deflected heat rays indirectly onto said overlapping surfaces to be joined to form the top closure of said container, the relative durations and numbers of said intervals of motion and dwell being selected so that the plastic coatings of said selected surfaces do not achieve a heat-sealing temperature.

4. In the method of forming a liquid-tight seal at the top of a container made from a paperboard blank having a polyethylene coating on both sides thereof, said container being formed by folding said blank along score lines and heat sealing overlapping surfaces of the folded blank, said folding providing an extensible pouring spout at one end of the top of said container and adapted to be housed in collapsed condition within said container when said container is closed, the steps of advancing said container in upright position and with the top substantially open through a heating zone, periodically stopping the advance of said container through said heating zone to provide successive intervals of motion and dwell, directing heat rays onto the top of said container while said container is in said heating zone to heat the polyethylene coatings of said overlapping surfaces to be joined to form the top closure of said container to a heat-sealing temperature, partially shielding said container from said heat rays during said intervals of dwell by providing baffle members located in the path of said heat rays and spaced from each other in the direction of advance of said container, said baffle members deflecting heat rays directed during said intervals of dwell at selected surfaces of said blank forming a part of the top of said container and constituting at least a major portion of said pouring spout, directing a portion of said deflected heat rays directly onto said overlapping surfaces to be joined to form the top closure of said container, and directing another portion of said deflected heat rays indirectly onto said overlapping surfaces to be joined to form the top closure of said container, the relative durations and numbers of said intervals of motion and dwell being selected so that the polyethylene coatings of said selected surfaces do not achieve a heat-sealing temperature.

5. The method of forming a liquid-tight seal at the top of a container made from a paperboard blank having a polyethylene coating on both sides thereof, said container being formed by folding said blank along score lines, said folding providing closure surfaces at the top of said container adapted to be overlapped to form a top closure and providing an extensible pouring spout at one end of the top of said container and adapted to be housed in collapsed condition within said container when said container is closed and adapted to be urged into its extended position upon opening of said container, said method comprising the steps of advancing said container in upright position and with the top substantially open through a heating zone, periodically stopping said advance of said container through said heating zone to provide successive intervals of motion and dwell, directing heat rays downwardly onto the top of said container while said container is in said heating zone to heat said polyethylene coatings of said closure surfaces to a heat-sealing temperature, partially shielding said container from said heat rays during said intervals of dwell by providing baffle members located in the path of said heat rays and spaced from each other in the direction of advance of said container, said baffle members deflecting heat rays directed during said intervals of dwell at the surfaces forming at least a major portion of said extensible spout, advancing said container from said heating zone through a closure zone, and closing the top of said container in said closure zone, said closure surfaces being brought into said overlapping position during said closure step and with the overlapping polyethylene surfaces at said heat-sealing temperature thereby to provide a liquid-tight seal.

6. The method of forming a liquid-tight seal at the top of a container made from a paperboard blank having a heat-sealable plastic coating on both sides thereof, said container being formed by folding said blank along score lines, said folding providing closure surfaces at the top of said container adapted to be overlapped to form a top closure and providing an extensible pouring spout at one end of the top of said container and adapted to be housed in collapsed condition within said container when said container is closed and adapted to be urged into its extended position upon opening of said containers, said method comprising the steps of advancing said container in upright position and with the top substantially open through a heating zone, periodically stopping said advance of said containers through said heating zone to provide successive intervals of motion and dwell, directing heat rays downwardly onto the top of said container while said container is in said heating zone to heat said plastic coatings of said closure surfaces to a heat-sealing temperature, partially shielding said container from said heat rays during said intervals of dwell by providing baffle members in the path of said heat rays and being spaced from each other in the direction of advance of said container, said baffle members each having a generally cycloidal cross section and being arranged to deflect heat rays directed during said intervals of dwell at the surfaces forming at least a major portion of said extensible spout, directing a portion of said deflected heat rays onto closure surfaces of said container, advancing said container from said heating zone through a closure zone, and closing the top of said container in said closure zone, said closure surfaces being brought into said overlapping position during said closure step and with the overlapping plastic surfaces at said heat-sealing temperature thereby to provide a liquid-tight seal.

7. The method of forming a liquid-tight seal at the top of a container made from a paperboard blank having a polyethylene coating on both sides thereof, said container being formed by folding said blank along score lines, said folding providing closure surfaces at the top of said container adapted to be overlapped to form a top closure and providing an extensible pouring spout at one end of the top of said container and adapted to be housed in collapsed condition within said container when said container is closed and adapted to be urged into its extended position upon opening of said container, said method comprising the steps of advancing said container in upright position and with the top substantially open through a heating zone, periodically stopping said advance of said container through said heating zone to provide successive intervals of motion and dwell, directing heat rays downwardly onto the top of said container while said container is in said heating zone to heat said polyethylene coatings of said closure surfaces to a heat-sealing temperature, partially shielding said container from said heat rays during said intervals of dwell by providing baffle members in the path of said heat rays and being spaced from each other in the direction of advance of said container, said baffle members each having a generally cycloidal cross section and being arranged to deflect heat rays directed during said intervals of dwell at the surfaces forming at least a major portion of said extensible spout, directing a portion of said deflected heat rays directly onto closure surfaces of said container, directing a portion of said deflected heat rays indirectly onto closure surfaces of said container, advancing said container from said heating zone through a closure zone, and closing the top of said container in said closure zone, said closure surfaces being brought into said overlapping position during said closure step and with the overlapping polyethylene surfaces at said heat-sealing temperature thereby to provide a liquid-tight seal.

8. In apparatus for heat-sealing the top closure of gable-top paper milk containers and the like having a heat-sealable plastic coating, said container tops being formed by folding the container blanks along score lines to provide overlapping closure surfaces and an extensible pouring spout at one end of the top of each container, said spout being adapted to be housed in collapsed condition within the container when the container is closed and being adapted to be urged into its extended position upon opening of said container; the combination comprising a heating zone, means for intermittently advancing said containers in single file and in upright spaced-apart condition through said heating zone, said heating zone having a plurality of linearly spaced dwell positions and said advancing means being arranged to advance said containers from dwell position to dwell position and to retain each container in each dwell position for a predetermined time interval, means to maintain said closure tops in predetermined substantially open condition throughout at least the major portion of said heating zone, a source of radiant heat, means to direct said radiant heat downwardly onto the tops of said containers in said heating zone to heat the plastic coatings of said closure surfaces to a heat-sealing temperature, and a plurality of reflecting baffles spaced from each other in the direction of container advance and each disposed generally above the container location in a respective dwell position of said heating zone and being interposed in the path of heat rays directed at the surfaces forming at least a major part of the extensible spout of the container located in the respective dwell position during said predetermined time interval thereby to shield said surfaces of said extensible spout during said predetermined time interval.

9. In apparatus for heat-sealing the top closure of gable-top polyethylene coated paper milk containers and the like, said container tops being formed by folding the container blanks along score lines to provide overlapping closure surfaces and an extensible pouring spout at one end of the top of each container, said spout being adapted to be housed in collapsed condition within the container when the container is closed and being adapted to be urged into its extended position upon opening of said container; the combination comprising a heating zone, means for intermittently advancing said containers in single file and in upright spaced-apart condition through said heating zone, said heating zone having a plurality of linearly spaced dwell positions and said advancing means being arranged to advance said containers from dwell position to dwell position and to retain each container in each dwell position for a predetermined time interval, means to maintain said closure tops in predetermined substantially open condition throughout the major portion of said heating zone, a source of radiant heat, means to direct said radiant heat downwardly onto the tops of said containers in said heating zone to heat the polyethylene coatings of said closure surfaces to a heat-sealing temperature, and a plurality of reflecting baffles each disposed generally above the container location in a respective dwell position of said heating zone and being interposed in the path of heat rays directed at the surfaces forming at least a major part of the extensible spout of the container located in the respective dwell position during said predetermined time interval, each of said baffles having a generally cycloidal cross section and being disposed at a height relative to the uppermost edges of the container tops such that heat rays impinging on an upper portion of the baffle will be reflected upwardly and heat rays impining on a lower portion of the baffle will be reflected directly onto adjacent container closure surfaces.

10. In apparatus for heat-sealing the top closure of gable-top polyethylene coated paper milk containers and the like, said container tops being formed by folding the container blanks along score lines to provide overlapping closure surfaces and an extensible pouring spout at the front end of the top of each container, said spout being adapted to be housed in collapsed condition within the container when the container is closed and being adapted to be urged into its extended position upon opening of said container; the combination comprising a heating zone, means for intermittently advancing said containers in single file and in upright spaced-apart condition through said heating zone, said heating zone having a plurality of linearly spaced dwell positions and said advancing means being arranged to advance said containers from dwell position to dwell position and to retain each container in each dwell position for a predetermined time interval, means to maintain said closure tops in predetermined substantially open condition throughout the major portion of said heating zone, a source of radiant heat, said source comprising a plurality of elongated heating elements extending axially of the path of advance of said containers and being laterally spaced relative thereto, means to direct said radiant heat downwardly onto the tops of said containers in said heating zone to heat the polyethylene coatings of said closure surfaces to a heat-sealing temperature, said last mentioned means comprising an axially extending reflecting surface disposed above said heating elements, and a plurality of reflecting baffles each disposed generally above the container location in a respective dwell position of said heating zone and being interposed in the path of heat rays directed at the surfaces forming at least a major part of the extensible spout of the container located in the respective dwell position during said predetermined time interval, each of said baffles having a generally cycloidal cross section and being disposed at a height relative to the uppermost edges of the container tops such that heat rays impinging on about the upper half portion of the baffle will be reflected upwardly toward said reflecting surface and heat rays impinging on about the lower one-eighth portion of the baffle will be reflected directly onto adjacent container closure surfaces.

11. In apparatus for heat-sealing the top closure of gable-top polyethylene coated paper milk containers and the like, said container tops being formed by folding the container blanks along score lines to provide overlapping closure surfaces and an extensible pouring spout at the front end of the top of each container, said spout being adapted to be housed in collapsed condition within the container when the container is closed and being adapted to be urged into its extended position upon opening of said container; the combination comprising a heating zone, means for intermittently advancing said containers in single file and in upright spaced-apart condition through said heating zone, said heating zone having a plurality of linearly spaced dwell positions and said advancing means being arranged to advance said containers from dwell position to dwell position and to retain each container in each dwell position for a predetermined time interval, means to maintain said closure tops in predetermined substantially open condition throughout the major portion of said heating zone, a source of radiant heat, said source comprising a plurality of elongated heating elements extending axially of the path of advance of said containers and being laterally spaced relative thereto, means to direct said radiant heat downwardly onto the tops of said containers in said heating zone to heat the polyethylene coatings of said closure surfaces to a heat-sealing temperature, said last mentioned means comprising a pair of elongated axially extending generally parabolic reflecting surfaces disposed above said heating elements and on opposite sides of the axial center line of the path of advance of said containers through said heating zone, and a plurality of reflecting baffles each disposed generally above the container location in a respective dwell position of said heating zone and being interposed in the path of heat rays directed at the surfaces forming at least a major part of the extensible spout of the container located in the respective dwell position during said predetermined time interval, each of said baffles having a generally cycloidal cross section and being disposed at a height relative to the uppermost edges of the container tops such that heat rays impinging on about the upper half portion of the baffle will be reflected upwardly toward said reflecting surfaces and heat rays impinging on about the lower one-eighth portion of the baffle will be reflected directly onto adjacent container closure surfaces, each of said baffles having an axially extending generally V-shaped notch at one end to prevent reflection of heat rays directed at closure surfaces at the rear end of the respective container top during said predetermined time interval.

References Cited by the Examiner

UNITED STATES PATENTS

| | | | |
|---|---|---|---|
| 2,469,975 | 5/49 | McCloy | 53—44 X |
| 2,669,815 | 2/54 | Zinn | 53—373 X |
| 2,910,605 | 10/59 | Hodge | 313—113 |
| 3,002,328 | 10/61 | Monroe | 53—373 |

FRANK E. BAILEY, *Primary Examiner.*

ROBERT E. PULFREY, *Examiner.*